C. B. CONNELY.
ELECTRIC RAILWAY CONTROL SYSTEM.
APPLICATION FILED NOV. 10, 1915.
1,298,462.
Patented Mar. 25, 1919.
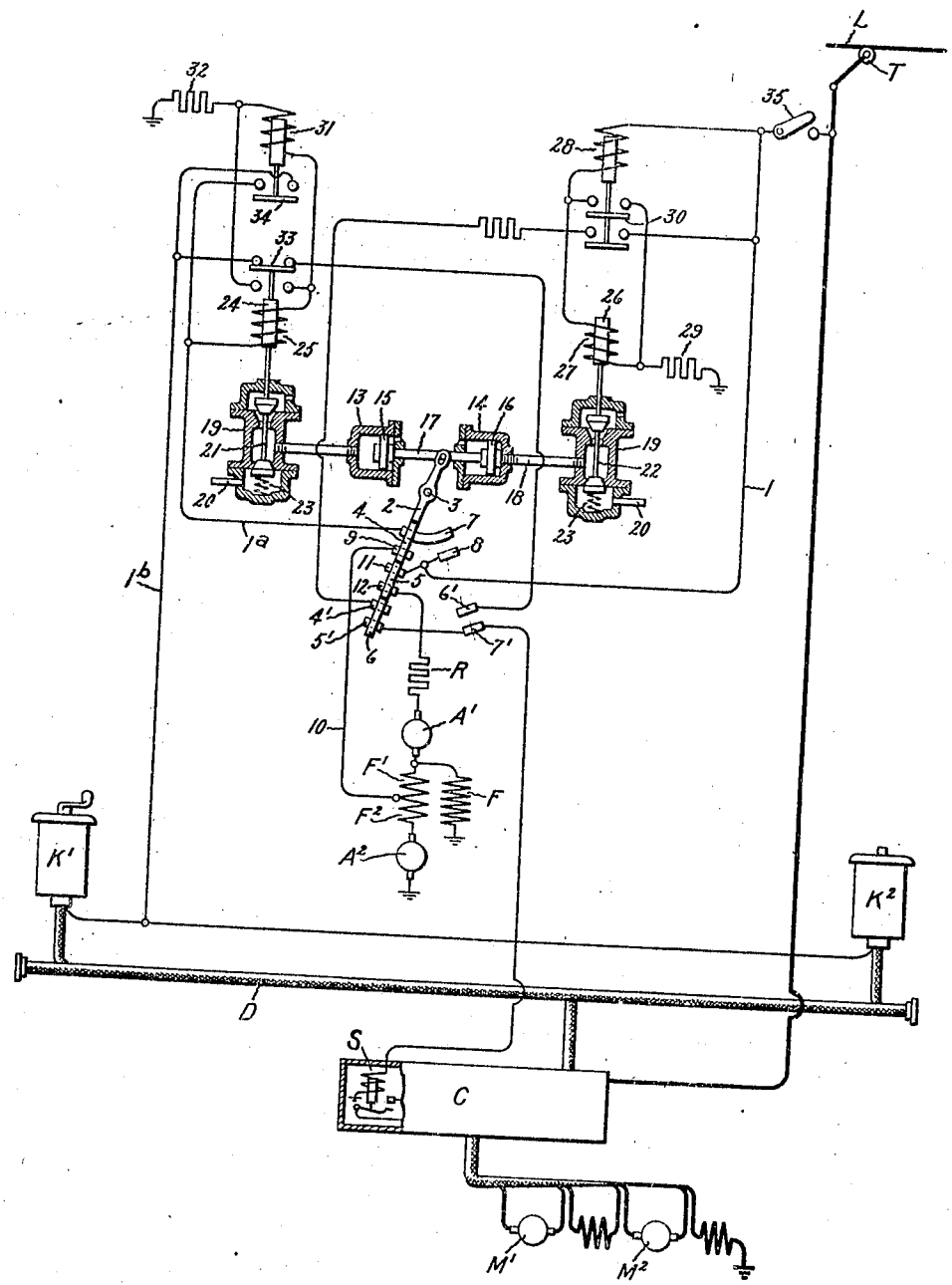
Inventor:
Charles B. Connely,
by Albert G. Davis
His Attorney

UNITED STATES PATENT OFFICE.

CHARLES B. CONNELY, OF SCOTIA, NEW YORK, ASSIGNOR TO GENERAL ELECTRIC COMPANY, A CORPORATION OF NEW YORK.

ELECTRIC-RAILWAY CONTROL SYSTEM.

1,298,462.

Specification of Letters Patent. Patented Mar. 25, 1919.

Application filed November 10, 1915. Serial No. 60,678.

*To all whom it may concern:*

Be it known that I, CHARLES B. CONNELY, a citizen of the United States, residing at Scotia, in the county of Schenectady, State of New York, have invented certain new and useful Improvements in Electric-Railway Control Systems, of which the following is a specification.

This invention relates to switches which automatically respond to a change in voltage. It is particularly useful in connection with electric railway cars when part of the road is operated at a higher potential than the other part. The control and lighting circuits of such a car are designed to operate upon the lower voltage, say 600 volts, and when the car enters upon that section of the road which has the higher potential, say, 1200 volts, it is the custom to reduce this higher voltage to the lower one for supplying the control and lighting circuits; usually by means of a dynamotor, which is disconnected when the car is operating upon the 600 volt section. With an equipment of this kind it is desirable that some device be provided for automatically connecting the control and lighting circuits of the car to the trolley either directly or through the dynamotor as the circumstances may require. This is also very desirable to prevent the high potential line current from being impressed upon the control circuit when the car enters upon the high potential section of the road, and to cut off the supply of current to motors the instant the high potential is applied and close it again when the proper connections are made.

The object of my invention is to provide a switch capable of accomplishing these purposes.

The accompanying drawing is a diagram of a control system for an electric railway car, embodying my improved selective switch and designed for operation on a line having sections of differing potential.

The trolley wire L is supplied with high potential, say 1200 volts, at some part or parts of the line, and at other portions with low potential, say 600 volts. The car carries a trolley T, and is equipped with two motors $M'$ $M_2$ and with master controllers $K'$ $K_2$ located at the ends of the car by which the operator controls the direction of movement and speed of the car. C represents the contactor box in which are located the contactors or electromagnetically operated switches which make and break the connections of the motor circuit under the control of the master controllers $K'$ $K_2$, to which they are connected by the train wires contained in the cable D. Located in the contactor box is a potential relay S which controls the energizing circuits of the contactors so that the contactors cannot operate unless the relay is closed. Current for the control circuit is taken from the trolley through a conductor 1 $1^a$ $1^b$, in which is interpolated my selective switch hereinafter described, which serves to put a dynamotor in series with said conductor when the line potential is high.

The dynamotor is shown diagrammatically. $A'$ $A^2$ are the two armature windings: $F'$ $F^2$ are the two series field windings connected in series with the two armature windings and arranged to oppose and neutralize each other; F is a shunt field winding; R is a rheostat for controlling the dynamotor, which, however, forms no part of my invention.

My selective switch by means of which the control circuits of the car are connected to the trolley, either directly or through the dynamotor, comprises a switch lever 2, pivoted at 3 and carrying three contacts 4, 5 and 6 insulated from each other. The contact 4 is constantly connected to the conductor $1^a$, preferably by bearing on a segment 7 connected to said conductor. This contact also coöperates with two segments 8 and 9 lying in the same arc; the former connected with the conductor 1 and the latter with the low potential point of the dynamotor by the conductor 10. The contact 5 is adapted to bridge across two segments 11, 12, one connected with the conductor 1 and the other with one terminal of the dynamotor. The contact 6 bridges the contacts $4'$ and $5'$ in one position and the contacts $6'$ and $7'$ in the opposite position for controlling the switch S. When the switch arm 2 stands in the position shown, the current coming through the conductor 1 must pass through the dynamotor before reaching the conductor 1ᵃ but if the switch arm is swung over so that the contact 4 bridges the segments 7, 8, current can pass directly from 1 to 1ᵃ and the dynamotor is cut out.

In order to swing the switch arm to and fro, it is preferably pivoted to the piston rod of a fluid pressure motor although other means may be provided for this purpose. The preferred form of motor comprises two cylinders 13, 14, in each of which is a piston 15, 16 attached to the ends of the piston rod 17. The cylinders are connected by pipes 18, with valve chests 19 connected by pipes with a source of fluid pressure; preferably the air brake system of the car.

In each valve chest is a double face valve 21 22. A spring 23 biases each valve upward against its lower seat, so as to close the passage between the pipes 20 and 18, but leaving the pipe 18 open to the atmosphere through the upper valve seat. The stem of the valve 21 is attached to the movable core 24 of a solenoid 25 and the stem of the valve 22 is similarly attached to the movable core 26 of a solenoid 27. This latter is in series with an electromagnetic switch or contactor 28 connected to the trolley, and also with a grounded resistor 29. The contactor 28 has a switch contact 30 which controls a shunt around the solenoid 27.

The solenoid 25 is connected to the conductor 1ᵃ and is in series with an electromagnetic switch or contactor 31 and a grounded resistor 32. A switch contact 33 carried by the core 24 controls a shunt around the contactor 31. The switch contact 34 of this contactor controls a gap between the conductors 1ᵃ anl 1ᵇ. A hand switch 35 enables the entire control system to be connected with the trolley or disconnected therefrom as desired.

The operation is as follows: The switch 35 is assumed to be closed. The solenoid 27 and contactor 31 are wound to respond to a potential of say 300 volts, but the solenoid 25 and the contactor 28 will not become operative until the line potential rises to say 700 volts. So long as the car is running on a low potential section of the line the switch 30 remains open; the core 26 of the solenoid 27 is pulled down; the valve 22 is depressed, and admits air pressure into the cylinder 14, forcing the piston 16 to the left and swinging the switch arm 2 over on the contact segments 7, 8, 6¹ and 7¹. The contactor 31 causes the switch 34 to close the gap between the sections of conductor 1ᵃ and 1ᵇ. The switch S closes when the switch arm 2 engages the contacts 6′ and 7′, the circuit being through these contacts, switch contact 33, switch 34, contacts 7 and 8 and conductor 1. Line current can then flow direct to the control circuits. Now let the car pass on to a high voltage section of the line. The contactor 28 instantly closes the switch 30 and shunts the solenoid 27, which at once permits the spring 23 to lift the valve 22 against its lower seat and shut off the air pressure from the cylinder 14; the contained air exhausting through a port above the upper valve seat. The solenoid 25 now being connected to the high potential at the same time pulls down its core, thereby opening the valve 21 and letting the air pressure flow to the cylinder 13, where it acts upon the piston 15 to throw the switch arm 2 to the position in which it is shown in the drawings and also opening the switch 33. The switch S also opens to open the contactors and cut off the current to the motor because of the opening of the contact at switch 33. This cuts the dynamotor into the control circuit between the conductor sections 1 and 1ᵃ, so that the current supplied to the control circuits will still remain at a potential of 600 volts. It also again closes the motor circuit by closing the switch S through contacts 4¹ and 5¹.

There is a time lag, however, in the operation of the valves and pistons which would permit a momentary flow of the high potential current into the control circuits before the dynamotor was cut in. In order to forestall such a dangerous occurrence, the switch contact 33 closes a shunt around the low potential contactor 31 at the instant the high potential solenoid and contactor operate. This causes the contactor 31 to open the control circuit at the switch 34, and thereby prevent all possibility of an accidental flow of high potential current into the control system. As soon, however, as the dynamotor is cut into service, the low potential current that it furnishes causes the contactor 31 to pick up again and the solenoid 25 to return to the inoperative position in which it is shown.

The air pressure is now shut off from both cylinders and the parts will remain in this position so long as the high potential contactor 28 keeps the switch 30 closed. Upon a return, however, to a low potential section of the line, the switch 30 will open, the solenoid 27 will open the valve 22 and the switch arm 2 will swing over again to the segments 7, 8, and cut out the dynamotor.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In an electric railway system the combination with a supply conductor carrying current of low potential in one portion and high potential in another, of a circuit for carrying low potential only, a source of low potential current, a switch adapted to control the connection between the source and its circuit, electromagnetic means for controlling said switch and responsive to direct changes from one potential to the other and means independent of said switch for preventing high potential from being applied to said low potential circuit.

2. In an electric railway system, the combination with a supply conductor carrying current of low potential in one portion and high potential in another, of a circuit for carrying low potential current only, a source of low potential current for said circuit, a switch automatically operated by the change from one potential to the other to connect said source to the low potential circuit when operating on the high potential portion of the line conductor and to connect the line conductor to the low potential circuit when operating on the low potential portion, and means whereby high potential is prevented from being applied to said low potential circuit even though the switch be in position for high potential operation.

3. In an electric railway system, the combination with a supply conductor carrying current of low potential in one portion and high potential in another, and electric motors supplied thereby, of a low potential circuit for controlling the operation of said motors, a source of low potential for said circuit, a switch automatically operated by the change from one potential to the other to connect said source to the low potential circuit when operating on the high potential portion of the line conductor and to connect the line conductor to the low potential circuit when operating on the low potential portion, and means independent of said switch for preventing high potential from being applied to said low potential circuit.

4. In an electric railway system, the combination with a supply conductor carrying current of low potential in one portion and high potential in another, of a circuit for carrying low potential current only, a source of low potential current, a switch adapted to control the connection between the source and its circuit, fluid pressure means for actuating said switch, and electromagnetic devices for controlling said means and responsive to changes in the potential of the line.

5. In an electric railway system, the combination with a low potential control circuit, of a dynamotor, a selective switch for cutting said dynamotor into said circuit in one position of said switch, fluid pressure means for actuating said switch, valves controlling said fluid pressure, and electromagnets for actuating said valves, one responsive to a low potential current and the other to a high potential.

6. In an electric railway system, the combination with a low potential control circuit, of a dynamotor, a selective switch for cutting said dynamotor into said circuit in one position of said switch, fluid pressure means for actuating said switch, valves controlling said fluid pressure, magnets for actuating said valves, one responsive to a low potential current and the other to a high potential and an electro-magnetic switch responsive to high potential current controlling a shunt around the low potential magnet.

7. In an electric railway system, the combination with a low potential control circuit, of a dynamotor, a selective switch for cutting said dynamotor into said circuit in one position of said switch, fluid pressure means for actuating said switch, valves controlling said fluid pressure, magnets for actuating said valves, one responsive to a low potential current and the other to a high potential and an electromagnetic switch controlling the low potential circuit and responsive to low potential current.

8. In an electric railway system, the combination with a low potential control circuit, of a dynamotor, a selective switch for cutting said dynamotor into said circuit in one position of said switch, fluid pressure means for actuating said switch valves controlling said fluid pressure, electromagnets for actuating said valves, one responsive to a low potential and the other to a high potential, an electromagnetic switch controlling the low-potential circuit and responsive to low potential current and a shunt around said switch controlled by the high potential current.

9. In an electric railway system, the combination with a supply conductor carrying current of low potential in one portion and high potential in another, of a circuit for carrying low potential current only, a source of low potential current for said circuit, a switch for connecting either the supply conductor or said source to the low potential circuit, fluid pressure means for actuating said switch, valves controlling said fluid pressure and electro-magnets for actuating said valves one responsive to the low potential current and the other to high potential.

10. In an electric railway system, the combination with a supply conductor carrying current of low potential in one portion and high potential in another, of a circuit for carrying low potential current only, a source of low potential current for said circuit, a switch for connecting either the supply conductor or said source to the low potential circuit, fluid pressure means for actuating said switch, valves controlling said fluid pressure, electromagnets for actuating said valves one responsive to a low potential current and the other to a high potential current, an electromagnetic switch controlling the low potential circuit and responsive to the low potential current and a shunt around said switch controlled by the high potential circuit.

In witness whereof, I have hereunto set my hand this 8th day of November, 1915.

CHARLES B. CONNELY.

Copies of this patent may be obtained for five cents each, by addressing the "Commissioner of Patents, Washington, D. C."